United States Patent
Gracy et al.

(10) Patent No.: US 9,037,661 B2
(45) Date of Patent: May 19, 2015

(54) SYSTEMS AND METHODS FOR PROVIDING SECURE ELECTRONIC DOCUMENT STORAGE, RETRIEVAL AND USE WITH MATCHING CRITERIA

(75) Inventors: Bernard E. Gracy, Southbury, CT (US); Surya R. Sagi, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 532 days.

(21) Appl. No.: 13/341,955

(22) Filed: Dec. 31, 2011

(65) Prior Publication Data

US 2012/0179766 A1 Jul. 12, 2012

Related U.S. Application Data

(60) Provisional application No. 61/430,497, filed on Jan. 6, 2011.

(51) Int. Cl.
*G06F 15/16* (2006.01)
*G06Q 10/10* (2012.01)
*H04L 12/58* (2006.01)

(52) U.S. Cl.
CPC .............. *G06Q 10/107* (2013.01); *H04L 51/22* (2013.01); *H04L 51/12* (2013.01)

(58) Field of Classification Search
CPC ................................................... G06Q 10/107
See application file for complete search history.

(56) References Cited

U.S. PATENT DOCUMENTS

| | | | |
|---|---|---|---|
| 6,604,132 B1* | 8/2003 | Hitt ................................ | 709/206 |
| 7,640,322 B2 | 12/2009 | Wendkos et al. | |
| 8,224,903 B1* | 7/2012 | Katz et al. ...................... | 709/206 |
| 2004/0122730 A1* | 6/2004 | Tucciarone et al. ............ | 705/14 |
| 2005/0160147 A1* | 7/2005 | Denney et al. ................. | 709/206 |
| 2006/0031296 A1* | 2/2006 | Wibeck .......................... | 709/206 |
| 2006/0253597 A1 | 11/2006 | Mujica | |
| 2009/0030884 A1 | 1/2009 | Pulfer et al. | |
| 2009/0138730 A1 | 5/2009 | Cook et al. | |
| 2011/0289158 A1* | 11/2011 | Terranova ...................... | 709/206 |

OTHER PUBLICATIONS

PCT/US2012/020412 International Search Report.
PCT/US2012/020412 Written Opinion.

* cited by examiner

*Primary Examiner* — Thomas Dailey
(74) *Attorney, Agent, or Firm* — Brian A. Lemm; Charles R. Malandra, Jr.; Steven J. Shapiro

(57) ABSTRACT

Systems and methods for integrated delivery and storage of digital mail are provided that combine consumer driven opt-in preferences with mailer driven matching criteria to ensure more accurate delivery. In one configuration the system obtains a digital mail piece intended for a particular digital mailbox. The system determines user opt-in preferences for the digital mail piece and obtains mailer matching criteria data associated with the digital mail piece. The system then delivers the digital mail piece to the digital mailbox only if consistent with the opt-in preferences and the matching criteria data.

16 Claims, 5 Drawing Sheets

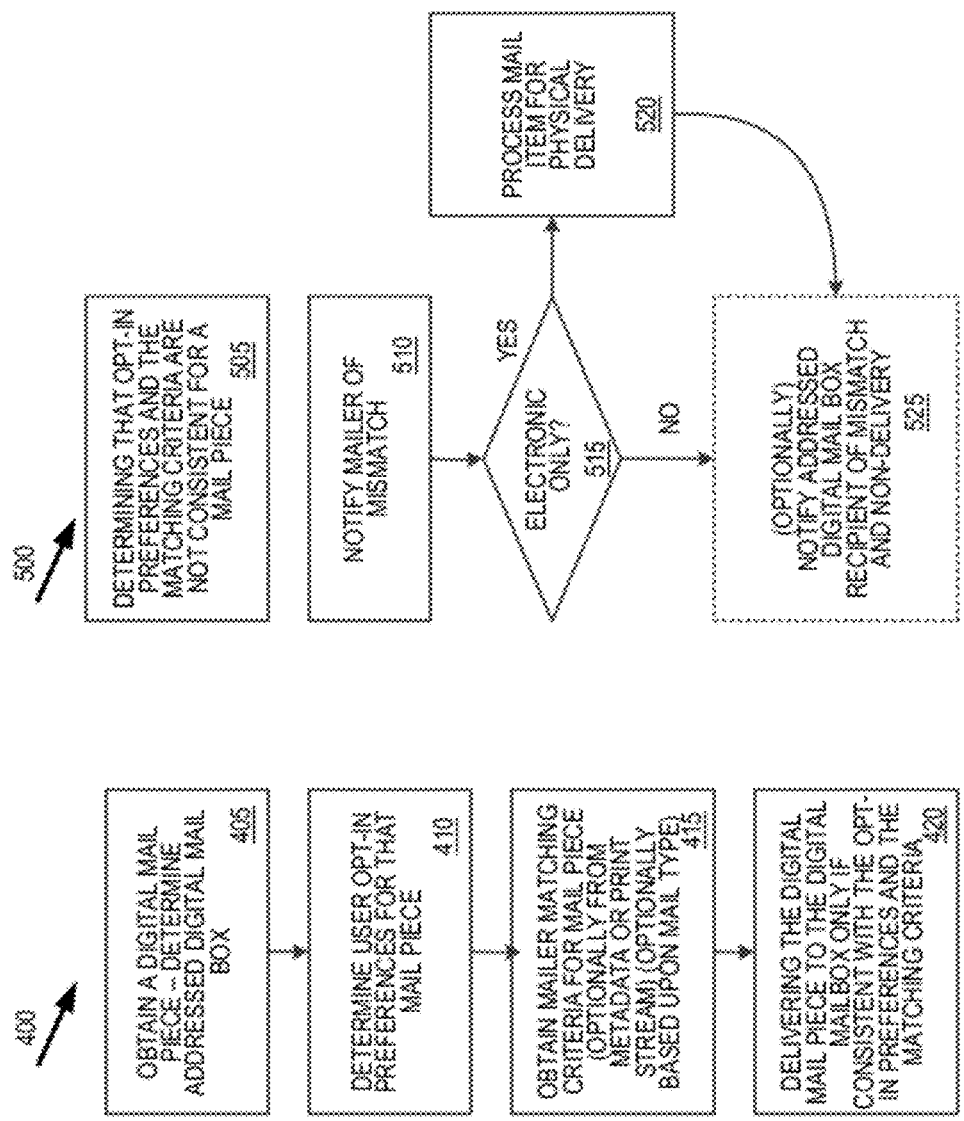

SYSTEMS AND METHODS FOR PROVIDING SECURE ELECTRONIC DOCUMENT STORAGE, RETRIEVAL AND USE WITH MATCHING CRITERIA

CROSS REFERENCE TO RELATED APPLICATIONS

This application claims priority under 35 U.S.C. section 119(e) from Provisional Patent Application Ser. No. 61/430,497, filed Jan. 6, 2011, entitled Systems and Methods for Providing Secure Electronic Document Storage, Retrieval and Use With Matching Criteria, by Surya R. Sagi, et al., which is incorporated herein by reference in its entirety.

TECHNICAL FIELD

The illustrative embodiments of the present application relate generally to document delivery systems and, more particularly, to new and useful systems and methods for combining consumer driven opt-in preferences with mailer driven matching criteria.

BACKGROUND

In the United States, many people are utilizing electronic access to financial and other transactional accounts. Additionally, there has been significant adoption of electronic bill payment in recent years, with electronic payment now outpacing payment by putting a check in the mail. However, many people prefer to continue to receive physical delivery of paper statements. Additionally, users may be concerned about incorrect delivery or unauthorized access to documents. Furthermore, consumers may dislike mass targeted direct mail and may not be satisfied with current opt-out messaging procedures and rules.

Systems and methods have been described for using a physical mailing address as an electronic mail address. For example, U.S. Pat. No. 7,478,140, entitled System and Method for Sending Electronic Mail and Parcel Delivery Notification Using Recipient's Identification Information, issued Jan. 13, 2009 to King, et al. describes a system using a recipient's physical address.

Digital mail systems exist today that process only digital mail messages that are delivered to digital mail recipients. However, such systems do not address at least the concerns noted above.

Accordingly, there is a need for systems and methods that provide for strong consumer-driven opt-in digital mail delivery procedures including mailer driven matching criteria to enhance delivery including by ensuring that documents are not misdirected. Moreover, there is a need for such systems that provide variable opt-in security based upon a type associated with the mail correspondence.

BRIEF DESCRIPTION OF THE DRAWINGS

The accompanying drawings show illustrative embodiments of the invention and, together with the general description given above and the detailed description given below serve to explain certain principles of the invention. As shown throughout the drawings, like reference numerals designate like or corresponding parts.

FIG. 4 is a flowchart diagram showing a process for delivering digital mail according to opt-in preferences and matching criteria according to an illustrative embodiment of the present application.

FIG. 5 is a flowchart diagram showing a process for handling delivery failures in a system having delivery opt-in preferences and matching criteria according to an illustrative embodiment of the present application.

SUMMARY

Figure 1:
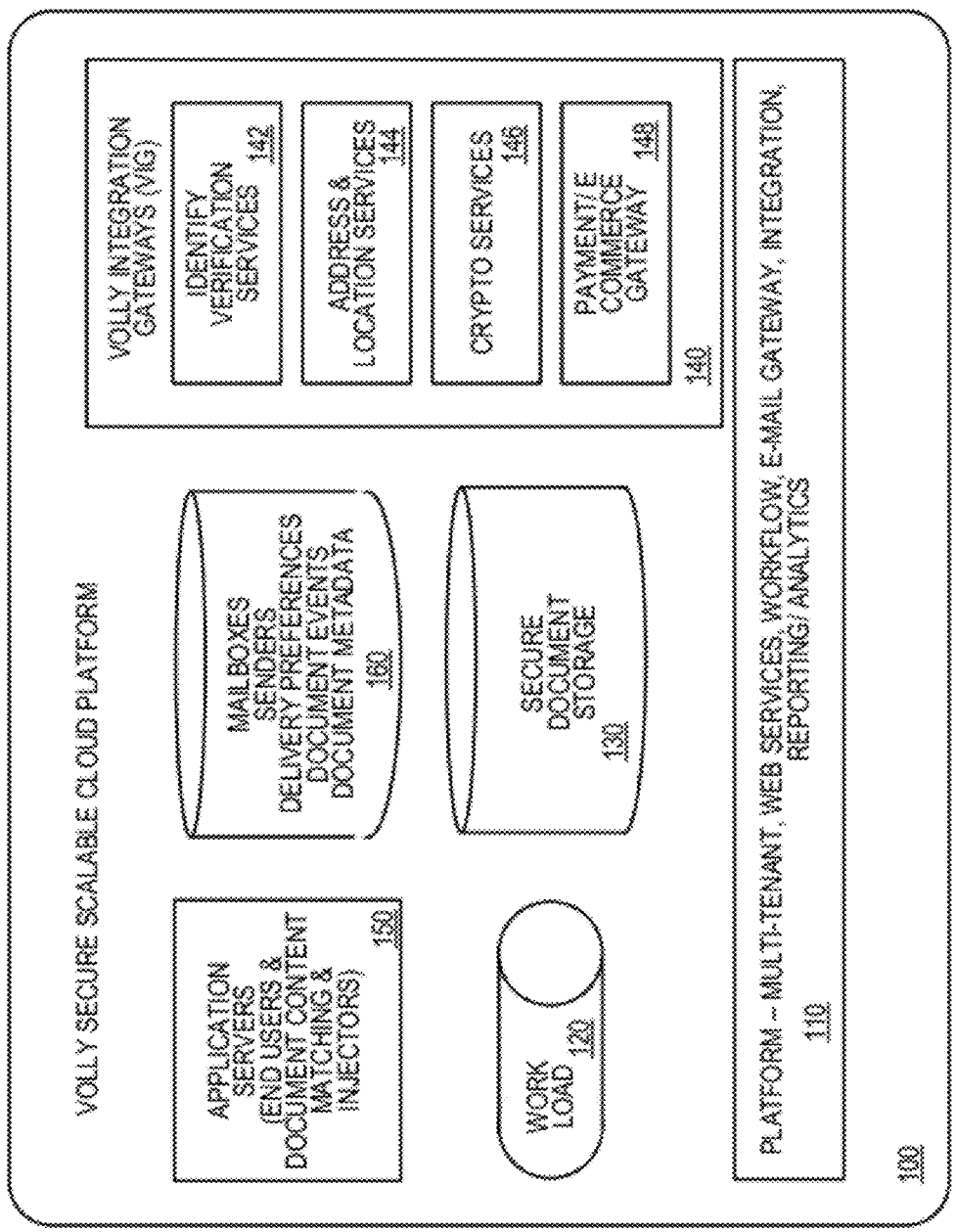
FIG. 1 is a schematic diagram showing a system for providing integrated mail receipt and storage according to an illustrative embodiment of the present application.

Illustrative systems and methods for allowing a digital mail recipient to manage delivery of digital mail are provided. In at least certain embodiments, strong opt-in procedures with matching criteria are used to reduce the chance of incorrect digital mail delivery or of unauthorized access to mail. In particular, if a mail piece intended for a different recipient is delivered based on incorrect physical address criteria, it is possible that the user of a digital mail box associated with that physical address may have also opted-in to deliver for that mailer. However, additional matching criteria are used for at least certain types of mail to ensure that such digital mail is not incorrectly delivered.

In at least certain embodiments, a computer implemented method for processing digital mail pieces from a mailer associated with a digital mailbox and a user includes obtaining a digital mail piece intended for the digital mailbox, determining user opt-in preferences for the digital mail piece, obtaining mailer matching criteria data associated with the digital mail piece, and delivering the digital mail piece to the digital mailbox only if consistent with the opt-in preferences and the matching criteria data.

In at least certain additional embodiments, the computer implemented method includes determining a type associated with the mail piece, and obtaining mailer matching criteria data associated with the digital mail piece by determining a matching criteria type associated with the mail piece type.

Several additional alternatives are disclosed and described herein.

DETAILED DESCRIPTION

The present invention is described in the context of illustrative embodiments directed to new and useful systems and methods for allowing mail recipients to manage delivery of digital mail. Several illustrative embodiments described herein refer interchangeably to the VOLLY secure digital delivery service, digital mailbox system (DMB) or Digital Mail Platform (DMP). The illustrative system provides a closed, secure, end-to-end system that consolidates and digitally delivers items, also called mail pieces, such as mail, transaction statements, marketing promotions, catalogs and other rich media from businesses to consumers. Mail pieces herein can refer to letters, bills, statements, postcards, flyers, offers, catalogs and other types of mail that are commonly received. This delivery may be based upon the recipient's (user, consumer) physical street address.

In at least certain embodiments, strong opt-in procedures with matching criteria are used to reduce the chance of incorrect digital mail delivery or of unauthorized access to mail. In particular, if a mail piece intended for a different recipient is delivered based on incorrect physical address criteria, it is possible that the user of a digital mail box associated with that physical address may have also opted-in to deliver for that mailer. However, additional matching criteria are used for at least certain types of mail to ensure that such digital mail is not incorrectly delivered.

The illustrative embodiments provide a novel consumer experience, allowing customers to help manage their lifestyles with greater convenience and control. This new communications channel provides benefits to mailers including by providing a low-cost yet trusted and secure electronic distribution platform, with minimal expense in switching from existing mailing processes including physical mailing processes. Moreover, mailers (senders, billers, etc.) are provided the opportunity to provide timely alternative physical delivery if the digital mail delivery fails.

Consumers are provided several benefits including the ability to aggregate mail digitally from multiple providers, to enjoy secure remote access from a single log-in, and to choose from a wealth of options for sorting, prioritizing, processing, paying, archiving, retrieving, discarding and reporting on all their mail-based activities across numerous electronic client platforms including smart phones, tablets, laptop computers, desktop computers and other network capable computing devices. Moreover, the consumers are provided enhanced management and scheduling tools to aggregate time-sensitive data for mail pieces received electronically, by physical mail and/or by user uploading of documents into the system such as for secure storage and record keeping. Additionally, it may offer consumers opt-in control over how they will be marketed and communicated to, and in what format. Here, an illustrative system providing for strong consumer opt-in control with additional mailer matching criteria is described that may provide for greater delivery accuracy.

Several illustrative hardware and software systems and subsystems are described herein that may be implemented using one or more alternative architectures. Here, in an alternative applicable to any of the embodiments the system is implemented on a cloud based platform using Infrastructure as Service (IaaS) architecture for processing and storage such as the RACKS PACE CLOUD, and TERREMARK ECLOUD platform or the AMAZON EC2 platform. Alternatively, the systems, processes and storage functions described may be implemented using other hosting architectures such as in-house, dedicated hosting, shared hosting or some other hosting model. As a further alternative, the MICROSOFT AZURE platform may be utilized.

Several illustrative hardware and software systems and subsystems are described herein that may advantageously utilize certain available components. For example, automated document factories having many configurations may be purchased from Pitney Bowes Inc. located in Stamford, Conn. Similarly, certain print-to-mail systems are available from the Pitney Bowes Emtex and Pitney Bowes Business Insight subsidiaries of Pitney Bowes Inc. located in Stamford, Conn. Systems herein may utilize print stream processing systems, document printing, insertion and franking systems and electronic bill presentment and payment (EBPP) systems available from Pitney Bowes Inc. The servers described are typically INTEL architecture servers such as DELL servers using the WINDOWS SERVER operating system software and the databases utilize APACHE CASSANDRA database systems. Alternatively, ORACLE database systems may be utilized. Additionally, the illustrative embodiments are described as enhancements to previously commercially available software systems marketed by EMTEX available from Pitney Bowes Inc. of Stamford, Conn.

Additionally, certain outgoing mail print stream processing systems have been described for separating documents in a print stream or batch into two separate print streams—a physical delivery print stream and an electronic delivery print stream based on customer delivery preferences. Commonly-owned U.S. Pat. No. 6,343,327, entitled System and Method for Electronic and Physical Mass Mailing, issued to Daniels, Jr., et al. on Jan. 29, 2002 describes such systems and is incorporated by reference herein in its entirety. Such systems described therein may be modified using the systems, processes and techniques described herein to provide an initial delivery channel with a backup channel that is used when deemed necessary.

Mail pieces such as variable data documents that are printed and mailed (i.e. statements, invoices, targeted marketing communications) often contain time sensitive information. It is essential for document owners (senders) to ensure timely delivery of these documents to their customers. Moreover, it is often financially beneficial if recipients take action on the mail piece timely. Traditionally, these documents are printed and mailed to customers. A growing number senders and customers are seeking electronic delivery options. If the electronic delivery is misplaced or not properly organized, the lost messages can cause payment or purchasing delays that have negative cash flow impact to the sender and penalties or lost opportunities for recipient customers.

Several illustrative embodiments of digital mailbox system designs are described that may be implemented for use alone or in various combinations.

Referring to FIG. 1, a schematic diagram showing a system 100 for providing integrated mail receipt and storage according to an illustrative embodiment of the present application is disclosed. In this illustrative embodiment, the platform 110 is hosted in an economical, scalable, multi-tenant cloud facility that provides for web services, workflow development and deployment, an e-mail gateway, external system integration and reporting/analytics facilities. Such a system provides for seamless redundancy, load balancing and geographic balancing. Several application server components are deployed such as an end user interface to handle end user mail piece recipient access to the system such as through PC browser based interface through the Internet or other appropriate network. Document content injectors and content processing systems are deployed. A process server 120 is deployed for executing system functionality.

The Recipient Mailbox framework and related data such as sender and recipient preference profile storage, document event storage and document metadata storage are provided for in memory storage 160. Secure document storage 130 is provided to store the received mail piece content documents such as PDF format documents received from mailers and PDF format documents scanned and uploaded by the user. Moreover, document metadata includes metadata associated with physically mailed mail pieces that are not necessarily stored in the electronic secure document storage 130. As described herein, opt-in and matching criteria for electronically mailed documents may be stored centrally for each user/recipient. When an electronic mail piece is addressed to the physical address of the user to ensure that the user/recipient has opted-in to receiving mail from that sender. Additionally, metadata such as an account number is used as additional matching criteria to ensure that the mail piece is an appropriate mail piece from the opted-in sender. In such situations, a document type is assigned to a mail piece and used to determine the type of matching criteria and in some cases the location of the matching criteria data. Depending on the document type, the matching criteria could include a specific unique account number, a geographic identifier or no matching criteria for certain types of mail pieces.

The system can accommodate digital mail documents received from a sender and documents scanned by the user. The documents may be identified using a numbering scheme that includes a type identifier. If the user elects to upload a scan of a mail piece, the system may assign a document identifier. For example, a user with system ID=99 could have a paper document ID for an uploaded document of P000000099000001 and an electronic document ID for a delivered document of E000000099000001, where the letters P and E distinguish paper from electronic and 99 is the customer number. Additionally a multiple digit document type filed can be added such as 0001 for bills resulting in P0000000990001000001 for a document identifier P(USER)(TYPE)(DOC). Alternatively UUID schemes may be used. If the user selects both (B) digital and physical delivery, the document identifier would be B0000000990001000001.

If type 0001 is a type bill, then the system may use an account number as a matching criteria type. Additional types and subtype are possible as described below. Moreover, for a particular sender and a particular mail piece type, the user/recipient may have alternative acceptable matching criteria such as required in a scenario in which a user has two credit cards from the same credit card company. Moreover, matching criteria may be customized per type for a particular sender.

Several illustrative gateways 140 are implemented in the cloud system including an identity verification gateway 142 that is used to verify the identity of system users/mail piece recipients. Additionally, address and location services gateways 144 are provided. A payment services/ecommerce gateway is provided to process bill payment and ecommerce activity such as catalog orders and promotional offer redemption activity. Certain cryptography functions may be implemented outside of the cloud system, so a cryptography services gateway 146 is provided. The internetworking connections may be secured using standard security processes and the documents and metadata/profiles may be encrypted.

In certain embodiments, a digital mailbox will be created for every individual living at every delivery point in the targeted geography of the DMP system. In such cases, the Digital Mail Platform provides an alternative delivery channel for items including mail, transaction statements, direct mail and catalogues by consolidating mail for consumers based on street address of the recipients. In such an illustrative embodiment, the Digital Mail Platform has at least 3 major systems and several subsystems interfacing to other products/systems for value added services. In a consumer mashup system, each consumer associate with street address and receive communications aggregated at address based digital mailboxes. The core platform system establishes digital mailboxes and associate the content received from mailers & publishers to consumers and provide additional value added services. The Secure Mailer Gateway creates content for digital mailboxes with required metadata and security. System will split and send e-Delivery of mail that has been opted in for e-Delivery.

Consumers are able to access their mail from different web/e-mail/mobile clients digitally with security and content certification. The Digital Mailbox will help consumers manage their life better and should offer features beyond just mail management. The Digital Mail Platform provides an ecosystem which is secure, economical and competitive for high volume mailers, postal carriers and consumers. The illustrative systems described herein may facilitate large scale systems to accommodate mail traffic consistent with country-wide activity or even larger regional or global traffic. The U.S. population is over 300 million people. Additionally, the number of valid physical street addresses in the U.S. postal system is greater than 110 million addresses. It is possible that a Digital Mail Platform could handle mail segment volumes including Potential Transaction statements of 1 Billion pieces/year and Potential Direct Mail of 2 Billion pieces/year, or more. Each digitized document might average 200 Kbytes or more using one or more formats. Such as system may support 2 Million concurrent users and may support very fast response time for various user requests such 2 seconds for login and 1 second to view a mail piece.

Figure 2:
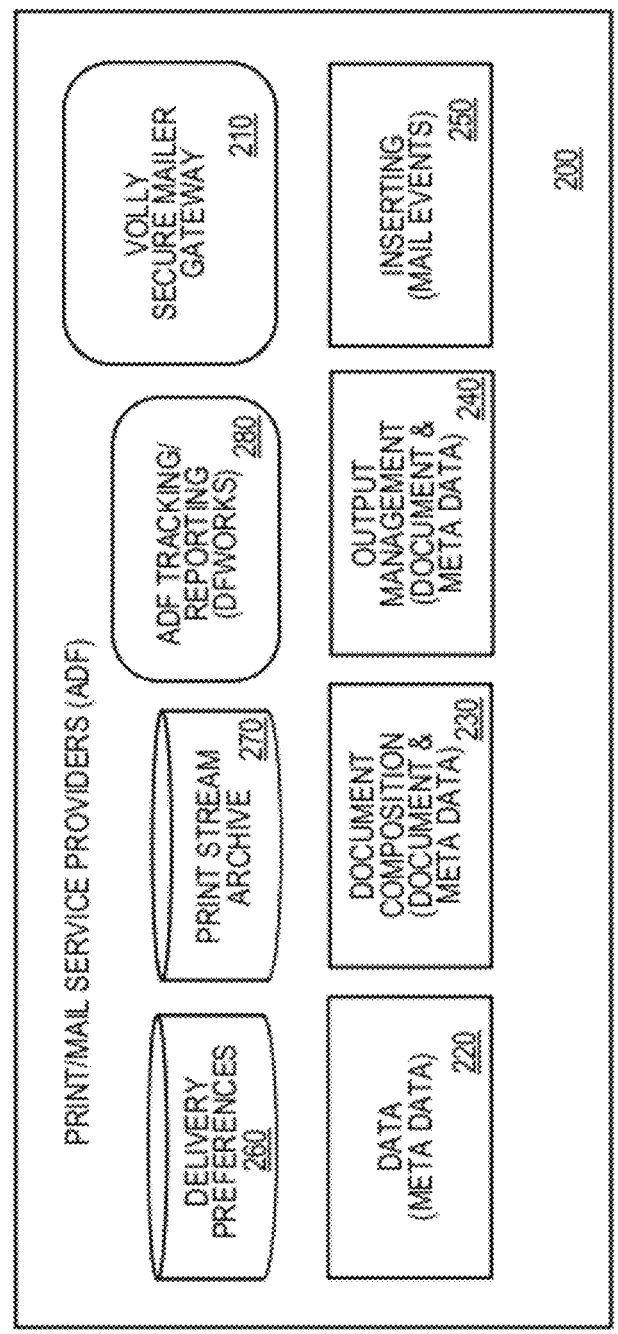
FIG. 2 is a schematic diagram showing an automated document factory for providing mail information for opt-in delivery according to an illustrative embodiment of the present application.

Referring to FIG. 2, a schematic diagram showing an automated document factory (ADF) 200 for providing mail information for opt-in delivery according to an illustrative embodiment of the present application is disclosed. Here, the ADF 200 may be implemented at a large company mail center, an outsourced mail center and/or an aggregate mail processing center. Recipient delivery preferences may be stored locally for company clients 260, may be integrated into the print stream or may be queried from an offsite data source during or shortly prior to print stream processing activities. Accordingly, when a financial institution processes a large batch of credit card statements to be sent to tens of thousands of recipients, they may be processed by such an ADF. A print stream archive may be maintained in memory storage 270.

The DFWORKS system 260 available from Pitney Bowes Inc. of Stamford, Conn. may be utilized for ADF tracking and reporting. Metadata is stored in memory storage 220, document composition to create/add/store/manipulate metadata occurs in server 230, output management for document and metadata output (including time-sensitive data such as calendar entries) are processed by server 240. A mail event inserter process runs on server 250 to provide for targeted promotional offer insertion, etc. Finally, the VOLLY secure mailer gateway system obtains electronic delivery data from the ADF for electronic mail pieces and physical mail pieces (meta data) for delivery into the VOLLY cloud architecture in the proper format. If the print stream is mined to obtain matching criteria data, then print stream manipulation systems will be used in the ADF. Alternatively, matching criteria data may be found in metadata associated with a mail piece.

Figure 3:
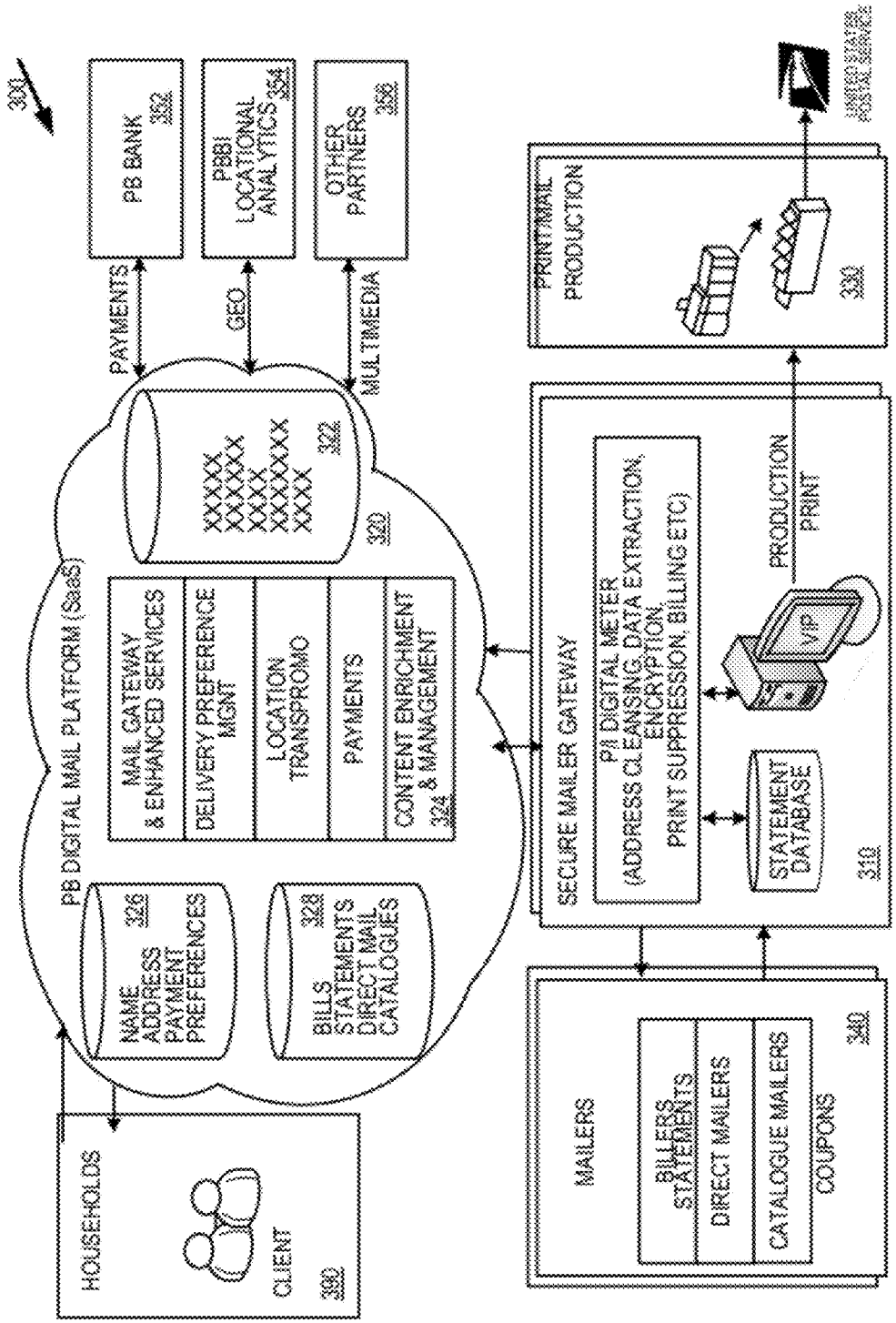
FIG. 3 is a schematic diagram showing a mail system according to an illustrative embodiment of the present application.

Referring to FIG. 3 is a schematic diagram showing a mail system 300 according to an illustrative embodiment of the present application. The system 300 provides the entire ecosystem for creation/delivery and processing of mail pieces delivered electronically and physically. Here, the household client, recipients and users of the system 390 typically use a PC based browser to access the DMP through the Internet or through some other suitable connection such as a wireless connection. The many diverse mailers 340 are represented and will process bills, statements, direct promotional mail, catalogues, coupons, etc. An automated document factory includes digital processing 310 and physical processing 330. The physical mail pieces in this illustrative embodiment are delivered by the United States Postal Service (USPS). The DMP 320 is connected to partners such as payment partners 352 for processing payments, location data partners 354 and other partners 356. Cloud processing services are hosted in cloud processing facility 324 and storage is shown at 322. Specific storage types include the individual user information with name, address and payment preferences, etc. 326 and document storage for bills, statements, direct mail and catalogues, etc. 328. Here, the user 390 may select an individual catalog from a particular sender for delivery (e.g., not any of their catalogs). When that catalog is published, it is electronically delivered to the user. Similarly, direct mail may be selected by opt-in from a sender or for a category as a first opt-in, but then require a second opt-in matching criteria such as a geographical data match of zip or city/state. Opt-in preferences and matching criteria may be stored in 326.

Referring to FIG. 4, a flowchart diagram showing a process 400 for delivering digital mail according to opt-in preferences and matching criteria according to an illustrative embodiment of the present application is disclosed. In step 405, the system obtains a digital mail piece from a sender such as from ADF SMG 310. Here, the DMP determines which digital mail box the digital mail piece is addressed to. For example, if the digital mail piece is addressed using a physical address, the system determines which digital mail box is associated with that particular physical address. If additional address information is used such as a first/last name pair, then the system determines which digital mail box is associated with that particular physical address and first/last name pair.

In step 410, the system determines user opt-in preferences for that mail piece. For example, when the digital mail box is known, the associated user has opt-in preference data stored in the DMP. Here, the system for example determines that VISO is a valid sender and the opt-in criteria is met for the determined intended recipient.

In step 415, the system obtains matching criteria for the digital mail piece. Accordingly, there is a second data check in addition to clearing the sender as an opted-in sender. For example, if matching criteria types are used, the system determines the matching criteria type to one or more levels such as Bill or Bill/credit-card. Here, for a bill/credit-card, it is determined that the account number must match to have acceptable matching criteria for delivery. The system then obtains the matching criteria data such as bill metadata for account number or obtains the matching criteria data by scanning the print stream or by scanning the electronic version of the mail piece. One set of illustrative matching criteria organized by mail piece content type is shown below in TABLE 1.

TABLE 1

| Content Type | Matching Criteria | Functionality |
| --- | --- | --- |
| Bills and Statements | (1) Physical Address | Physical Address used to direct Mail to a particular digital mail box |
| Bills and Statements | (2) Account Number | Statement or bills only inserted into user's digital mail box if account number matching criteria matches. |
| Coupons | (1) opt-in based on sender or category, etc. | Coupons inserted into user's digital mail box if opted-in |
| Coupons | (2) ZIP or CityandState, etc. (geographic data) | Coupons inserted if opted-in and also matching criteria met |
| Catalogs | (1) User Selection | Catalogs inserted into user's digital mail box based upon specific opt-in (selection) for the particular version of the catalog. |

In step 420, the system delivers the digital mail piece to the digital mailbox only if the digital mail piece is determined to be consistent with both the opt-in preferences and the matching criteria.

In one illustrative embodiment, a computer implemented method for processing digital mail pieces from a mailer associated with a digital mailbox and a user includes obtaining a digital mail piece intended for the digital mailbox, determining user opt-in preferences for the digital mail piece, obtaining mailer matching criteria data associated with the digital mail piece, and delivering the digital mail piece to the digital mailbox only if consistent with the opt-in preferences and the matching criteria data.

In an alternative, the computer implemented method includes determining a type associated with the mail piece, and obtaining mailer matching criteria data associated with the digital mail piece by determining a matching criteria type associated with the mail piece type. For example, the type could be a bill or a second level type could be a bill/credit-card. In such cases, the matching criteria type would be an account number.

In another alternative method, obtaining mailer matching criteria data associated with the digital mail piece includes obtaining mail piece metadata associated with the matching criteria type. In yet another alternative method, obtaining mailer matching criteria data associated with the digital mail piece includes scanning a print stream associated with the mail piece to obtain mail piece data associated with the matching criteria type.

In yet another alternative, the computer implemented method includes determining if the determined matching criteria type includes a bill, and if the matching criteria includes a bill, then setting the matching criteria type to include an account number. In yet another alternative, the method includes determining if the determined matching criteria type includes an offer, and if the matching criteria includes an offer, then setting the matching criteria type to include geographic data. In yet another alternative, the method includes obtaining a digital mail piece intended for the digital mailbox by obtaining a mail piece addressed to a physical address associated with the user.

Referring to FIG. 5, a flowchart diagram showing a process 500 for handling delivery failures in a system having delivery opt-in preferences and matching criteria according to an illustrative embodiment of the present application is disclosed. In step 505, the system determines that opt-in preferences and/or the matching criteria are not consistent for a mail piece. For example, the digital mail box associated with the physical address of a mail piece may be opted-in for communications from VISO or even opted-in for communications of type bill from VISO, but the matching criteria does not match. For example, the VISO bill account number being mailed does not match the one or more VISO account numbers on file for the user of that digital mailbox for VISO accounts.

In step 510, the system notifies the mailer, e.g., VISO of the mismatch and delivery failure. Here, the DMP can send a message to the SMG 310 for delivery to mailer 340. In step 515, the system determines if the recipient delivery preferences for the misdirected mail piece are electronic only. If they are, the process proceeds to step 520 to instruct the system to commence physical delivery immediately. For example, such decision may be based upon mail piece type. If the mail piece type is an offer, then the system does not process the mail piece for physical delivery. If the mail piece type is a bill, then the system immediately processes the mail piece for physical delivery upon digital delivery failure so that the bill is delivered in as timely a manner as possible. The process then proceeds to optional step 525 to notify the addressed digital mail box recipient that there has been a mismatch non-delivery. If the mail piece delivery preference was not electronic only, then the process also proceeds to optional step 525.

In one illustrative embodiment, a computer implemented method for processing digital mail pieces from a mailer associated with a digital mailbox and a user includes obtaining a digital mail piece intended for the digital mailbox, determining user opt-in preferences for the digital mail piece, obtaining mailer matching criteria data associated with the digital mail piece, delivering the digital mail piece to the digital mailbox only if consistent with the opt-in preferences and the matching criteria data, and notifying a sender of the digital mail piece of a delivery failure only if the digital mail piece is not delivered due to inconsistent opt-in preferences or matching criteria data.

In an alternative method, if the digital mail piece is configured for digital only delivery and the digital mail piece is not delivered due to inconsistent opt-in preferences or matching criteria data, then, the method further includes processing the digital mail piece for physical delivery.

In another alternative, the method further includes sending a notification to the user of the delivery failure only if the digital mail piece is not delivered due to inconsistent opt-in preferences or matching criteria data.

Figure 6:
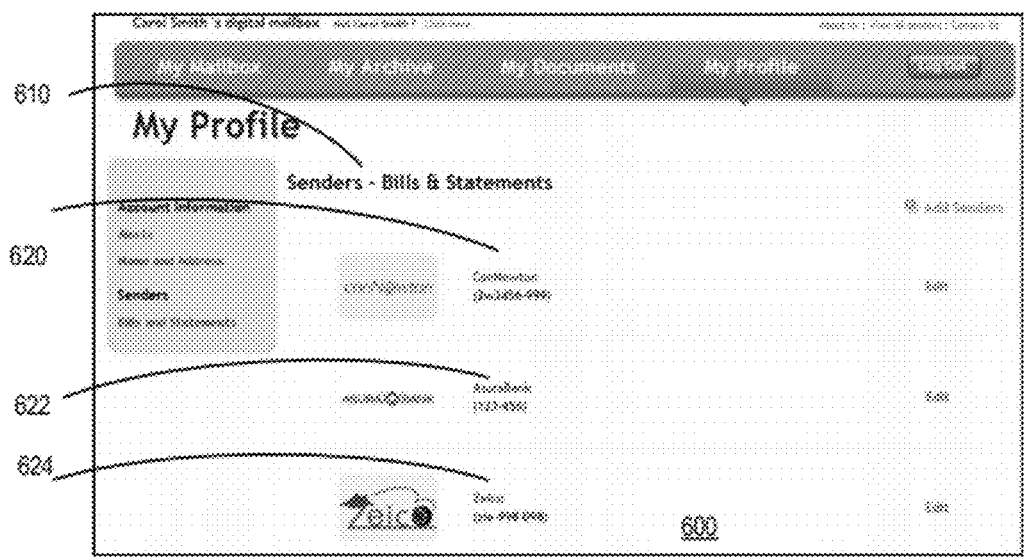
FIG. 6 is a diagram showing a screen display of illustrative opt-in mailers with associated matching criteria according to an illustrative embodiment of the present application.

Referring to FIG. 6, a diagram showing a screen display 600 of illustrative opt-in mailers with associated matching criteria according to an illustrative embodiment of the present application is shown. The screen 600 shows a list of senders—for mail piece type bills and statements (bills) 610. Here, a first sender ConNewton 620 is opted-in. The account 2W3456-999 is used as a matching criteria. A second sender AsuraBank 622 is opted-in and used account number 123-456 as a matching criteria. A third sender Zeico is opted in and uses policy number zie-998-098 as a matching criteria. If the user has multiple accounts with AsuraBank, then there would be a corresponding number of acceptable matching criteria account numbers. For one or more mail piece types, alternative acceptable matching criteria may be used. For example, one or more matching criteria would enable delivery. For offers, alternative matching criteria may be used such as date range, and geography. For one or more mail piece types, multiple matching criteria may be required for acceptable delivery. For example, both an acceptable mail date range and an account number would have to match.

Matching criteria using mail piece types and sub-types according to the table below may be used with the embodiments described herein. For example, several different types and matching criteria types are used in TABLE 2 shown below for digital mail box user 99. Each user would have a similar table stored in the DMP. In each case, the user name or a particular spelling, format or nickname may be used as matching criteria to ensure that the mailer is using the exact name as expected by the recipient.

TABLE 2

| Doc Type | Doc Sub-type | Type code | Opted-in Sender | Matching criteria type | Matching criteria data |
|---|---|---|---|---|---|
| Bills | | 1001 | | | |
| | Utility | 1101 | ConNewton | Account# | 2w3456-999 |
| | Bank | 1201 | Asura | Account# | 123-456 |
| | Insurance | 1301 | | | |
| | Insurance-car | 1311 | Zeico | Policy# | Zie-998-098 |
| offers | | 2001 | | | |
| | Coupon | 2101 | Macys | City | Danbury |
| | Coupon-clothes | 2111 | josabank | Zip | 06840 |

Figure 7:
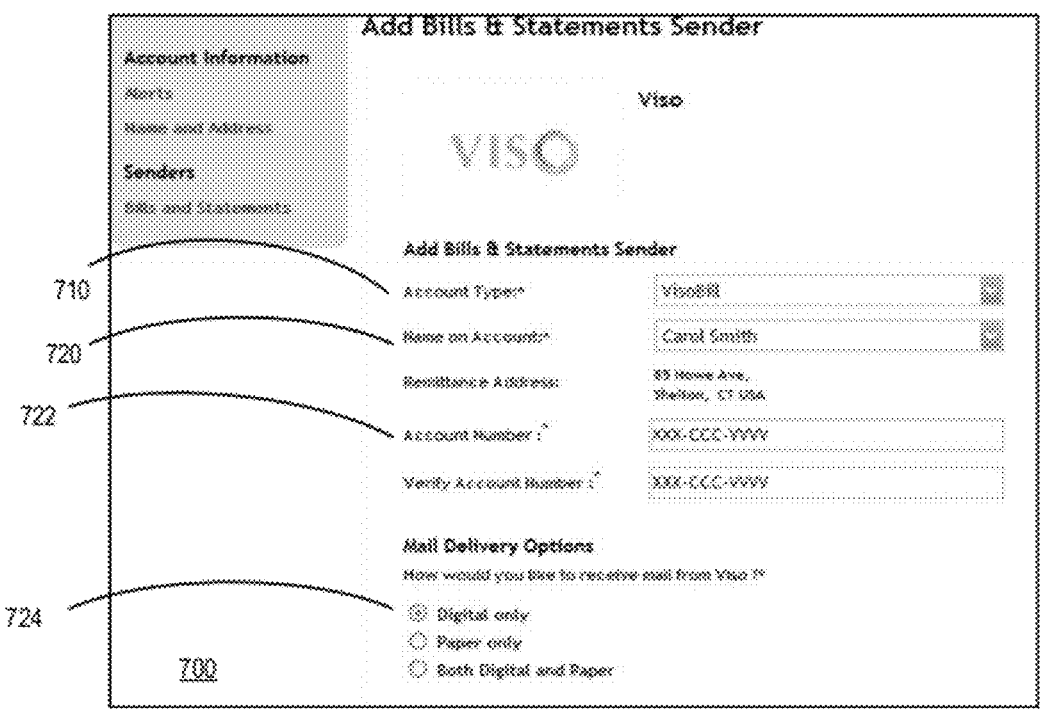
FIG. 7 is a diagram showing a screen display of an opt-in entry by mail type with matching criteria according to an illustrative embodiment of the present application.

Referring to FIG. 7 is a diagram showing a screen display 700 of an opt-in entry by mail type with matching criteria according to an illustrative embodiment of the present application is shown. Here, a screen to add bills and statements and to opt-in to receiving them as digital mail is shown. The account type 710 provides a mail piece type such as a bill or in finer levels of detail, bill/credit-card or bill/credit-card/VISO. Then field 720 provides a particular spelling of the user's name. Additionally, field 722 includes a double entry verified field for the account number that is used as matching criteria to ensure more accurate delivery. The mailing address is provides and the user then selects a delivery option 724 to determine if the mail piece should be delivered digital only, paper only or both digital and paper.

The SMG or Secure Mailer Gateway is one of the data compilers which help to capture the matching criteria data. When data arrives at the SMG, the SMG pulls the information based upon pre-determined data selection. In the described embodiments, illustrative user client devices 390 may include a desktop personal computer, a laptop personal computer, a tablet personal computer, smartphone and/or PDA or the like. They may be connected to the Internet using a wired connection, a wireless LAN connection and/or wireless WAN/cellular or other suitable alternative. Each of the user client devices is a DELL desktop, laptop or tablet respectively and executes a WINDOWS 7 operating system and an INTERNET EXPLORER browser or a MOTOROLA device such as a DROID 3 or XYBOARD executing the ANDROID operating system or APPLE IPAD or IPHONE executing the iOS operating system. Each client device includes at least one processor, display, input such as a keyboard and mouse, RAM memory for data and instructions, disk memory, network and external storage connections.

If the above mentioned cloud architectures are not used, the server may include a DELL POWEREDGE M1000E server, but other servers may be used including geographically dispersed and/or load balanced servers. Such servers includes at least one processor, RAM memory for data and instructions, disk memory, network and external storage connections. Alternatively, an IBM POWER 795 Server or APACHE Web Server may be utilized. Here, the Internet is utilized for many of the network connections of the systems 100/300, but other networks including LAN, WAN, cellular, satellite and other wired and/or wired networks may be used for one or more of the interconnections shown. The databases storing user login information and user account information may be configured using an available relational database such as ORACLE 12i or MICROSOFT SQL server or APACHE CASSANDRA. Any or all of the databases may be resident in a single server or may be geographically distributed and/or load balanced. They may be retrieved in real time or near real time using networking such as web services connected to third party data providers. Many alternative configurations may be used including multiple servers and databases including a geographically distributed system. The processes described herein may be implemented in C++, Java, C# on a MICROSOFT WINDOWS 7 platform and utilize the ADOBE CQ5 web content management system. Alternatively, PHP code may be used with open source systems and APACHE web server with APACHE CASSNDRA databases. Other alternatives such as the JOOMLA content management system and MYSQL databases may be utilized.

Typical mailers include organizations that create and deliver transactional and periodic physical communications that are often sent by first class mail such organizations including utilities, financial institutions, marketers and government agencies. Such mailers have IT systems that include recipient databases and IT systems used to provide print streams such as legacy mainframe systems that provide print stream data for statements, etc. that may be printed in the native format or reformatted and enhanced before printing. Alternatively, a Mailer may own and operate system.

In certain illustrative embodiments, the system receives a single print stream from a mailer and uses recipient profile data received from the mailer or otherwise obtained from the user to split the print stream into physical and electronic delivery streams. The Physical Distribution subsystem (printing/mailing of hard copy) is implemented in the illustrative embodiment as an automated document factory (ADF) using mail piece creation systems described may be obtained from Pitney Bowes Inc. of Stamford, Conn. that include the PITNEY BOWES SERIES 11 inserter systems, the PITNEY BOWES INTELLIJET printing system, and the PITNEY BOWES DM INFINITY postage meter. The documents produced may include the full range of documents processed in ADFs including direct mail, statements such as monthly or financial transaction statements of accounts, credit cards and brokerage accounts and may also include bills for services and utilities and goods purchased. The physical mail is then delivered to a physical mailbox for the household 70 and accessed by a member of the household.

In alternatives, the Digital Distribution subsystem may be implemented as a combination of email push systems and World Wide Web hosted electronic messaging pull systems. E-messaging system available from the Pitney Bowes Business Insights group may be built into the server.

Additionally, certain redundant communications processing systems have been described. Commonly-owned, co-pending U.S. patent application Ser. No. 12/650,751, entitled System and Method for Providing Redundant Customer Communications Delivery Using Hybrid Delivery Channels, filed by Sagi, et al. on Dec. 31, 2009 describes such systems and is incorporated by reference herein in its entirety. Such systems described therein may be modified using the systems, processes and techniques described herein.

Furthermore, certain print stream processing systems have been described for serving multiple mail recipients in a household. Commonly-owned, co-pending U.S. patent application Ser. No. 12/651,324, entitled System and Method for Electronic Delivery of Mail, filed by Sagi, et al. on Dec. 31, 2009 describes such systems and is incorporated by reference herein in its entirety. Such systems described therein may be modified using the systems, processes and techniques described herein.

Any of the alternatives described herein may be combined and/or interchanged with embodiment and alternatives including individual components thereof as appropriate.

Although the invention has been described with respect to particular illustrative embodiments thereof, it will be understood by those skilled in the art that the foregoing and various other changes, omissions and deviations in the form and detail thereof may be made without departing from the scope of this invention.

What is claimed is:

1. A computer system for delivering digital mail pieces from a mailer to a digital mailbox associated with a user comprising:
   a processor operatively connected to a memory, the memory comprising instructions to cause the processor to execute instructions including,
   obtaining a digital mail piece intended for the digital mailbox,
   determining user opt-in preferences for the digital mail piece,
   determining a type for the digital mail piece,
   obtaining mailer matching criteria data for the mailer that is associated with the digital mailbox based on the determined type of digital mail piece,
   obtaining matching criteria data associated with the digital mail piece, and
   delivering the digital mail piece to the digital mailbox only if consistent with the opt-in preferences and the matching criteria data associated with the digital mail piece matches the mailer matching criteria data for the mailer that is associated with the digital mailbox,
   wherein if the digital mail piece is configured for digital only delivery and the digital mail piece is not delivered due to inconsistent opt-in preferences or the matching criteria data associated with the digital mail piece does not match the mailer matching criteria data for the mailer that is associated with the digital mailbox, then the processor further executes instructions including processing the digital mail piece for physical delivery.

2. The system of claim 1, wherein,
   obtaining matching criteria data associated with the digital mail piece comprises obtaining mail piece metadata.

3. The system of claim 1, wherein,
   obtaining matching criteria data associated with the digital mail piece comprises scanning a print stream associated with the mail piece.

4. The system of claim 1, further comprising:
   the processor to execute instructions including:
   determining if the determined type includes a bill, and if the determined type includes a bill, then setting the mailer matching criteria data to include an account number.

5. The system of claim 1, further comprising:
   the processor to execute instructions including:
   determining if the determined type includes an offer, and if the determined type includes an offer, then setting the mailer matching criteria data to include geographic data.

6. The system of claim 1, wherein,
   obtaining a digital mail piece intended for the digital mailbox comprises obtaining a mail piece addressed to a physical address associated with the user.

7. The system of claim 1, further comprising:
   the processor to execute instructions including:
   notifying a sender of the digital mail piece of a delivery failure only if the digital mail piece is not delivered due to inconsistent opt-in preferences or the matching criteria data associated with the digital mail piece does not match the mailer matching criteria data for the mailer that is associated with the digital mailbox.

8. The system of claim 1, further comprising:
   the processor to execute instructions including:
   sending a notification to the user of a delivery failure only if the digital mail piece is not delivered due to inconsistent opt-in preferences or the matching criteria data associated with the digital mail piece does not match the mailer matching criteria data for the mailer that is associated with the digital mailbox.

9. A computer implemented method for delivering digital mail pieces from a mailer to a digital mailbox associated with a user comprising:
   obtaining a digital mail piece intended for the digital mailbox,
   determining user opt-in preferences for the digital mail piece,
   determining a type associated with the digital mail piece,
   obtaining mailer matching criteria data for the mailer that is associated with the digital mailbox based on the determined type of digital mail piece, obtaining matching criteria data associated with the digital mail piece, and delivering the digital mail piece to the digital mailbox only if consistent with the opt-in preferences and the matching criteria data associated with the digital mail piece matches the mailer matching criteria data for the mailer that is associated with the digital mailbox, wherein if the digital mail piece is configured for digital only delivery and the digital mail piece is not delivered due to inconsistent opt-in preferences or the matching criteria data associated with the digital mail piece does not match the mailer matching criteria data for the mailer that is associated with the digital mailbox, then processing the digital mail piece for physical delivery.

10. The method of claim 9, wherein, obtaining matching criteria data associated with the digital mail piece comprises obtaining mail piece metadata.

11. The method of claim 9, wherein, obtaining matching criteria data associated with the digital mail piece comprises scanning a print stream associated with the mail piece.

12. The method of claim 9, further comprising:

determining if the determined type includes a bill, and if the determined type includes a bill, then setting the mailer matching criteria data to include an account number.

13. The method of claim 9, further comprising:

determining if the determined type includes an offer, and if the determined type includes an offer, then setting the mailer matching criteria data to include geographic data.

14. The method of claim 9, wherein, obtaining a digital mail piece intended for the digital mailbox comprises obtaining a mail piece addressed to a physical address associated with the user.

15. The method of claim 9, further comprising:

notifying a sender of the digital mail piece of a delivery failure only if the digital mail piece is not delivered due to inconsistent opt-in preferences or the matching criteria data associated with the digital mail piece does not match the mailer matching criteria data for the mailer that is associated with the digital mailbox.

16. The method of claim 9, further comprising:

sending a notification to the user of a delivery failure only if the digital mail piece is not delivered due to inconsistent opt-in preferences or the matching criteria data associated with the digital mail piece does not match the mailer matching criteria data for the mailer that is associated with the digital mailbox.

* * * * *